J. H. L. Tuck,
Fruit Drier.

No. 39,509.   Patented Aug. 11, 1863.

Witnesses:   Inventor:

UNITED STATES PATENT OFFICE.

J. H. L. TUCK, OF ST. CHARLES, ILLINOIS.

IMPROVED FRUIT-DRIER.

Specification forming part of Letters Patent No. 39,509, dated August 11, 1863.

*To all whom it may concern:*

Be it known that I, J. H. L. TUCK, of St. Charles, in the county of Kane and State of Illinois, have invented a new and Improved Fruit-Drying Device; and I do hereby declare that the following is a full, clear, and exact description of the same, reference being had to the accompanying drawings, making a part of this specification, in which—

Figure 1:
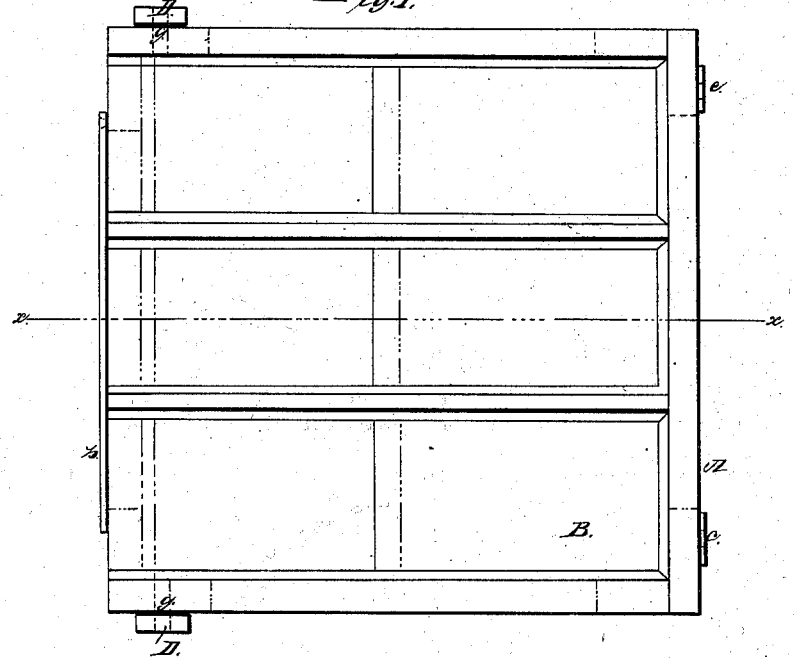
Figure 2:
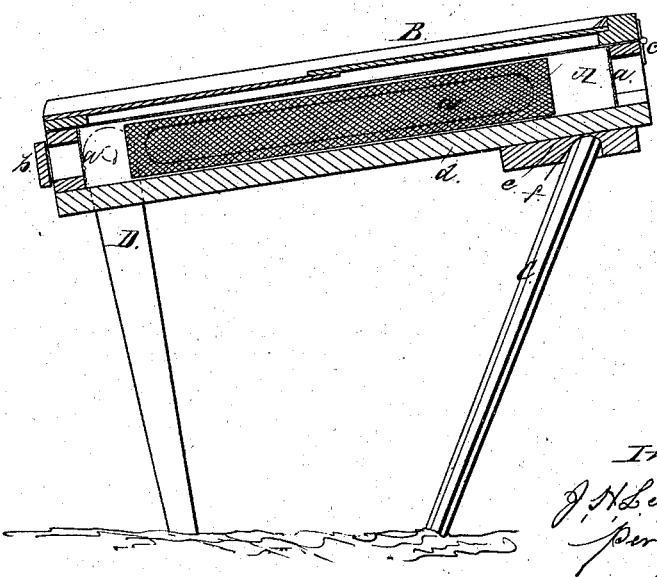

Figure 1 is a plan or top view of my invention; Fig. 2, a side sectional view of the same, taken in the line *x x*, Fig. 1.

Similar letters of reference indicate corresponding parts in the two figures.

The object of this invention is to obtain a simple and economical device for drying fruit, one which can be readily adjusted so as to receive the sun properly, be perfectly ventilated, and the fruit thoroughly protected from the weather.

To this end the invention consists in the employment or use of a shallow box provided with ventilating apertures at its sides and with a glazed sash at its top, the box being fitted on a stake or post, and having folding props, all arranged as hereinafter fully set forth.

To enable those skilled in the art to fully understand and construct my invention, I will proceed to describe it.

A represents a shallow box, constructed of boards or plank in rectangular form. The sides of the box A have openings made in them covered with wire-cloth *a*, to admit of a circulation of air through the box, and to exclude insects. These openings may be of any suitable size, and may be provided with covers *b* to exclude the air when necessary, or to prevent rain being driven into the box during severe storms. The top of the box is composed of a glazed sash, B, which may be constructed similar to a hot-bed or green-house sash. This sash is secured to the box on one side by hinges *c*. To the under side of the bottom *d* of the box A, near one end of the same, there is attached a cleat, *e*, which has a hole, *f*, made in it to receive the upper end of a stake or post, C, which is driven in the ground, and the box A near its opposite end has a leg or prop, D, attached to it—one near each side. These legs or props are attached to the box A by a pivot-bolt, *g*, so that they may be freely raised and lowered.

When the device is to be used, the stake C is driven in the ground at any desirable spot and the box A adjusted upon it—that is to say, the top of the stake or post fitted in the hole *f* in the cleat *e*. The legs or props D are then lowered and adjusted at a greater or less angle with a vertical line according to the degree of inclination it is desired to give the box A, in order to receive the sun properly or to shed the rain if stormy. The box A may be turned around on the stake or post C, and, therefore, may be adjusted properly to the sun at any hour of the day.

The device may be cheaply constructed and may be stowed away compactly when not required for use, as the legs or props D may be folded snugly up to the sides of the box A and the stake or post C withdrawn from the ground and placed within the box.

The ventilating openings in the sides of the box are an essential feature of the invention, as they admit a circulation of air through the box, which carries off the vapor or moisture from the drying fruit and greatly expedites the drying process.

Having thus described my invention, what I claim as new, and desire to secure by Letters Patent, is—

A fruit-drying case formed of a shallow box, A, having ventilating-openings at its sides, and provided with a glazed sash, B, for a top, and with folding legs or props D D, one at each side and used in connection with a stake or post, C, substantially as described.

J. H. L. TUCK.

Witnesses:
RINDA L. THYNG,
FANNIE SLEEPER.